United States Patent [19]

Rustecki

[11] 4,007,387
[45] Feb. 8, 1977

[54] ELECTRICAL SYNCHRONOUS MACHINES

[76] Inventor: Romuald Zdzislaw Rustecki, 99 Chertsey Lane, Staines, Middlesex, England

[22] Filed: May 14, 1975

[21] Appl. No.: 577,450

Related U.S. Application Data

[63] Continuation of Ser. No. 425,739, Dec. 18, 1973, abandoned.

[52] U.S. Cl. .............................. 310/42; 310/162; 310/181
[51] Int. Cl.² ..................................... H02K 15/00
[58] Field of Search ........... 310/181, 155, 162–168, 310/268, 46, 156

[56] References Cited
UNITED STATES PATENTS

| | | | |
|---|---|---|---|
| 2,635,547 | 4/1953 | Cataldo | 310/268 UX |
| 2,846,951 | 8/1958 | Metral et al. | 310/268 X |
| 3,247,407 | 4/1966 | Bruneel | 310/155 |
| 3,401,287 | 9/1968 | French et al. | 310/168 |
| 3,428,840 | 2/1969 | Kober | 310/181 X |

*Primary Examiner*—Donovan F. Duggan
*Attorney, Agent, or Firm*—Hill, Gross, Simpson, Van Santen, Steadman, Chiara & Simpson

[57] ABSTRACT

An electrical synchronous machine, i.e. an alternator or synchronous motor, comprises a rotor having field coils of alternating polarities arranged on core elements of magnetic material and spaced around its axis so as to produce a magnetic field extending away from the core elements and towards a stator which has windings disposed on an annular magnetic core, the rotor and stator being arranged substantially coaxially with the rotor core elements confronting the stator core. The machine can be installed quickly in a variety of ways by unskilled personnel and the field coils and stator core can be replaced without dismantling or disturbing the machine. Permanent magnets disposed in the field coil core elements augment excitation during starting. Auxiliary windings associated with the field coil core elements regulate speed and enable the machine, when acting as a motor, to be self-starting. The latter function is assisted by connecting all of the field coils in a closed loop. By providing a large number of field coils on the rotor and arranging the machine so that both the annular areas occupied by the active face of the stator and of the field coils take the form of like, radially narrow closed strips, the machine can produce a high output at low speed when functioning as an alternator.

12 Claims, 12 Drawing Figures

ELECTRICAL SYNCHRONOUS MACHINES

This is a continuation of application Ser. No. 425,739, filed Dec. 18, 1973, now abandoned.

FIELD OF THE INVENTION

This invention relates to electrical synchronous machines, i.e. to alternators and synchronous motors.

It is an object of the present invention to provide an electrical synchronous machine construction which can be used in machines of sizes ranging from very small to very large.

SUMMARY OF THE INVENTION

According to the invention, an electrical synchronous machine comprises a rotor having a plurality of field coils of alternating polarities arranged on core elements of magnetic material and disposed around the axis of rotation of the rotor to produce a magnetic field extending away from the core elements and axially of the rotor, and a stator having a plurality of windings arranged on an annular core of a magnetic material and disposed around an axis of the stator so that parts of the windings lie adjacent a surface of the core, the rotor and stator being positioned so that the rotor and the stator core are substantially coaxial and so that the rotor core elements confront said surface of the stator core.

With this construction, the field coils produce a magnetic field which extends axially away from the rotor towards the stator and alternates in polarity circumferentially of the rotor axis. When the machine is used as a generator, the rotor is driven so that the field is rotated with it. The field cuts the stator windings and induces currents in them. The frequency of the generated current is determined by the number of field coils (i.e. the number of poles) and the speed of rotation of the rotor. The stator can be wound to provide a single phase or polyphase output. When the machine is used as a synchronous motor, an alternating current is supplied to the stator windings so as to provide a magnetic field which extends axially away from the stator axis and rotates about the stator axis. The rotor is run up to synchronous speed so that the two fields rotate as the same speed and the rotor is driven by the rotating stator field.

The rotor can be of the salient pole or non-salient pole type. In the former case, the rotor core elements will be individual elements for each coil, whereas in the latter case the elements may form parts of a single rotor core. In one preferred form of salient pole rotor construction, the core elements for the field coils comprise like, individual pole yokes for each coil, the yokes each being secured at one end to a surface of a support member, which surface is normal to the axis of rotation of the rotor, the yokes extending axially away from the support surface and being equally spaced around the axis of rotation. Preferably, to provide a more regular variation in the polarity of the field circumferentially of the rotor axis, a respective, flat pole shoe is secured to the other end of each pole yoke, the surfaces of the shoes remote from the support member lying in a common plane normal to the axis of rotation of the rotor. In a particularly preferred construction, both the pole yokes and pole shoes, in cross-section normal to the axis of rotation of the rotor, are shaped substantially as the outer parts of sectors of circules centred upon the axis of rotation. With this construction, the field varies in a substantially sinisoidal manner circumferentially of the rotor axis, particularly if the radially extending edges of the pole shoes are chamfered.

A disadvantage of known synchronous machines is that they have to be dismantled by skilled electricians for inspection, cleaning, maintenance and repair. While this may not pose an insuperable difficulty to the large-scale user in an industrial country who has an adequate supply of skilled labour, to a small user, particularly in an undeveloped country, skilled help may be non-existant or very sparse and this disadvantage is thus very significant. Suppose for example, one or more field coils burns out. The machine has to be decoupled from its load or driving engine, and even if the user has gone to the expense of stocking a spare machine and has skilled labour available, because decoupling and installation of the spare machine takes a considerable time the facility provided by the machine will be unavailable for a corresponding time. If the user does not have a spare machine, the highly-skilled operation of rewinding the burnt-out field coil will take an even longer time, even if it can be carried out in situ.

To assist in overcoming this disadvantage, in the salient pole rotor machine described above each pole yoke is preferably secured to the support member by at least one threaded member extending through a hole in the support member and into a tapped hole in the yoke, whereby upon unscrewing of the threaded member the yoke and coil can be removed from the rotor transversely of the axis of rotation thereof without movement of the rotor or stator being necessary. Thus, if any of the field coils fails, by unscrewing the threaded member the failed coil together with the pole yoke and shoe (if any) can be removed in a very short time. A replacement unit can then be fitted in the converse manner in a similarly short time. No dismantling of the machine is necessary so that the down-time of the machine is very small and skilled labour is not needed. In the same manner, by reason of this constructional feature, a field coil can be removed from the machine for testing or inspection and thereafter replaced.

It has been found, somewhat surprisingly, that the air gap between the rotor and the stator does not, as in known machines, have to be as small as is practically possible. The air gap can in fact be quite large and it is often convenient for the gap to be large. In this case, when the machine is used as an alternator, during starting the residual magnetism of the field coil elements may not be sufficient to produce a field strong enough to cross the gap and provide an output: the alternator would fail to excite. To counteract this disadvantage, a respective permanent magnet may be disposed within each core element, each magnet having a polarity the same as that of the associated core element. In this case, when the driving engine speed is low during starting, the field produced by the permanent magnet reinforces that produced by the remanent magnetism of the field coil core elements to self-excite the alternator on starting. During full speed operation the permanent magnets reinforce the field generated by the field coils and may even reduce the total excitation current which would otherwise be needed at full speed. The permanent magnets never lose their magnetism, as they are constantly being magnetised in the correct direction by the main excitation field produced in normal operation.

The field coils are preferably connected to a pair of concentric slip rings on a surface of the support member opposite to the surface to which the pole yokes are secured. In this way, the shape of the machine is kept as narrow and flat as possible to retain the size and volume advantage per unit output which the present machine has over a conventional machine.

In a preferred form of the invention, at least one of core elements is provided with an auxiliary winding comprising a plurality of conductors each extending substantially radially through openings in the core element and radially inner and outer shorting conductors connecting said plurality of conductors together at their radially inner and outer ends, respectively.

The auxiliary winding serves two important functions. During normal operation of the machine it operates as a speed regulator by reducing any tendency for the machine to go over or under synchronous speed as might be caused by an abrupt increase in load or by an overload respectively. If the machine departs from synchronous speed so that the rotor and stator fields are not synchronised, a current is induced in the auxiliary winding in like manner to the way in which a current is induced in a cage rotor of induction motor, so producing a torque on the rotor which tends to restore it to synchronous speed.

The second function of the auxiliary winding is that it enables the machine, when used as a synchronous motor, to be self starting. Thus, if current is supplied to the stator windings when the rotor is stationary, the rotating field produced by the stator induces a current in the auxiliary winding, again in like manner to the way in which a current is induced in a cage rotor of an induction motor, so that the rotor is accelerated. When the rotor attains or approaches synchronous speed after acceleration in this manner, excitation is applied to the field coil and the machine thereafter functions in its normal, synchronous manner.

When the machine is running at synchronous speed the auxiliary winding has no effect as the two fields are then synchronised and flux does not cut the winding.

The "self-starting" feature provided by the auxiliary winding can be augmented or replaced by connecting the field coils to form a closed circuit including all of the coils. In this way, when a rotating field is produced by energising the stator, the current induced in the closed field coil circuit will give rise to a torque on the rotor which will accelerate it towards synchronous speed.

A disadvantage of salient pole alternators of the conventional tubular air gap type is that the total amount of power they can produce is limited by the fact that they cannot exceed a certain speed without being subjected to excessive centrifugal force. By designing such a conventional alternator with the maximum possible number of poles and running it at the maximum possible speed, the maximum amount of power which can presently be produced is somewhere in the region of one megawatt. Alternators in accordance with the present invention, however, can be designed so as to completely break through this power barrier. The way that this can be done will now be explained. The power produced by an alternator in accordance with the present invention is dependent on the co-acting annular working areas comprised by the annular surface of the stator and the corresponding annular area occupied by the core elements of the rotor field coils. Thus, in a large machine, the ratio of the annular extents of these areas to their outer radii, in accordance with this feature of the invention, is made small. As the area of a circular surface lies mainly in its outer region, a small increase in overall radius will compensate for the area lost. The working areas thus adopt the forms of rings or narrow closed strips and a large number of poles (say 32 or more) can be fitted to the rotor. In this way, due to the large number of poles, the alternator will produce a large power output while running at a low speed, for example at about 50 or 60 RPM or even lower. At this sort of speed, centrifugal force does not present any great problem. Thus, alternators embodying this feature of the invention can be built to provide an indefinitely large output without restrictions being imposed by centrifugal force.

By way of example, the above-mentioned radial extent/outer radius ratio is desirably less than 1:3, and will in many cases be much less than this value.

As well as increasing the total field length to enable a large number of poles to be used, this configuration also has the advantage that it enables the shape of the field coils and the stator slot angles to be improved.

As was mentioned before, it has been found, somewhat surprisingly, that the air gap between the rotor and stator of a machine in accordance with the invention dos not, as in known machines, have to be as small as is practically possible. Machines in accordance with the present invention can have air gaps varying upwardly from about 2.5 mm for a small machine to as much as 25cm for a very large machine. Moreover, it has also been found that the present machines will operate satisfactorily without any significant loss of efficiency or any excessive vibration if the rotor and stator axes are slightly inclined or mutually spaced and/or if the air gap departs significantly from the nominal value. These features can be taken advantage of if the rotor is attached to or attachable to a shaft of a device for driving or to be driven by the machine and the stator is mounted on a support structure, the rotor on the one hand, and the stator and support structure, on the other hand, being formed as entirely discrete elements whereby the machine may be made operable by positioning the support structure with respect to the load shaft so that the rotor and stator are mutually disposed as set forth.

This form of machine has a number of important advantages over the conventional type of machine.

It is cheaper and easier to manufacture as it need contain no shaft, bearings, end plates or bearing housing, and because there is no direct mechanical connection between the rotor and the stator the chances of mechanical damage are greatly reduced. Accordingly, no greasing or lubrication or any other kind of maintenance or servicing is needed. Also, as the machine need not have a casing, air can circulate freely past the rotor and stator, the former preferably rotating in free space, so that forced cooling is in most cases not required.

As those skilled in the art will appreciate, the installation of a conventional machine is a highly-skilled, time-consuming operation. The machine shaft and the shaft of the driving engine (in the case of an alternator) or of the load (in the case of a motor) have to be very precisely aligned. In complete contrast, no such precision is needed when installing a machine of the above form due to the lack of any mechanical connection between the rotor and stator and to the tolerance of the air gap to imprecise alignment. The machine can thus be installed quickly and, in many cases, by virtually unskilled personnel.

Preferably, the machine includes means releasably securing the stator core in a desired position with respect to the support structure and in such a manner that the stator core and the windings thereon can be removed from and replaced on the support structure without movement of the support structure. Should the stator windings burn out, the core and windings can be simply removed from the support structure by unskilled personnel and replaced by a new core and windings: no casing has to be opened and dismantled to allow access to the stator. In the same way, an undamaged stator can be removed for inspection and/or cleaning and then replaced. The advantages following from the stator core being simply replaceable are the same as those following from the above-discussed feature of the rotor field coils being replaceable.

In a preferred form of machine the support structure comprises an open-ended cylindrical frame arranged coaxially of the stator core and the means releasably securing the stator core comprise a plurality of threaded members extending radially inwardly through apertures in the frame. The core and windings are removed in a very straightforward manner by simply unscrewing the threaded members and withdrawing the core and windings from the frame. The same core or a replacement core can then be replaced in converse manner. If a replacement core is at hand, the whole withdrawal and replacement operation takes only a few minutes.

The means releasably securing the stator core may further comprise a plate which fits within the frame and is secured in place by the threaded members which are screwed into tapped holes in the plate, the stator being secured to the plate with said face thereof remote from the plate. With this arrangement, due to the fact that the plate fits within the frame, the location of the threaded members when replacing the core is simplified. The stator core may be secured to the plate by a plurality of axially directed screws, which extend through apertures in the plate and into tapped holes in the core. Thus, when the plate has been withdrawn, the core and windings may be simply and quickly unscrewed from the plate and a replacement fitted to the plate, which is then reaffixed to the frame.

In an alternative arrangement the plate is not provided, the threaded members being screwed directly into tapped holes in the stator core. This arrangement has the merits of cheapness and simplicity and also allows good circulation of air between the core and the frame.

The support structure may include a flat base member secured to the cylindrical frame and lying in a plane parallel to the axis of the frame. Installation of the machine is thereby greatly facilitated: the support structure, resting on the base member, is moved about until the rotor and stator are coaxial and have the required nominal air gap between their confronting faces. As the transmission of torque between the stator and rotor is accomplished entirely electromagnetically rather than mechanically, the rotor being supported solely by the load shaft, the alignment step is by no means the skilled precision operation necessary when installing a conventional machine. As was explained before, the present machine, will operate satisfactorily without any significant loss of efficiency or any excessive vibration if the axes are slightly inclined or mutually spaced and/or if the air gap departs significantly from the nominal value. This being so, the positioning of the stator support structure can be carried out by unskilled personnel. The structure merely has to be moved until the rotor and stator are more or less coaxial and the average air gap thickness as measured around the periphery is within about 10 percent of the nominal value, which varies upwardly from about 2.5mm. The base preferably has apertures therein for receiving fixing members (e.g. bolts), whereby the support structure can be fixed in place once it has been correctly positioned.

To cater for an alternative way of fixing the support structure, the cylindrical frame may have attached thereto, instead of or as well as the base member, a plurality of axially-extending sockets for receiving fixing members, whereby the structure can be secured to a surface lying in a plane perpendicular to the axis of the frame. In this way, the frame can be attached, for example, to the casing of the driving engine or load or to a framework associated with or forming part of the driving engine or load. In this case, it may be convenient for the shaft of the driving engine or load to extend through the centre of the stator so that the rotor is fitted outside of the stator, although the rotor can be fitted inside the stator if there is room, e.g. if the frame is fitted around the lip of a recess.

BRIEF DESCRIPTION OF THE DRAWINGS

The invention will be more readily understood from a consideration of the following description, given by way of example only, of various embodiments thereof, reference being made to the accompanying drawings, in which.

DETAILED DESCRIPTION OF THE PREFERRED EMBODIMENTS

Figure 1:
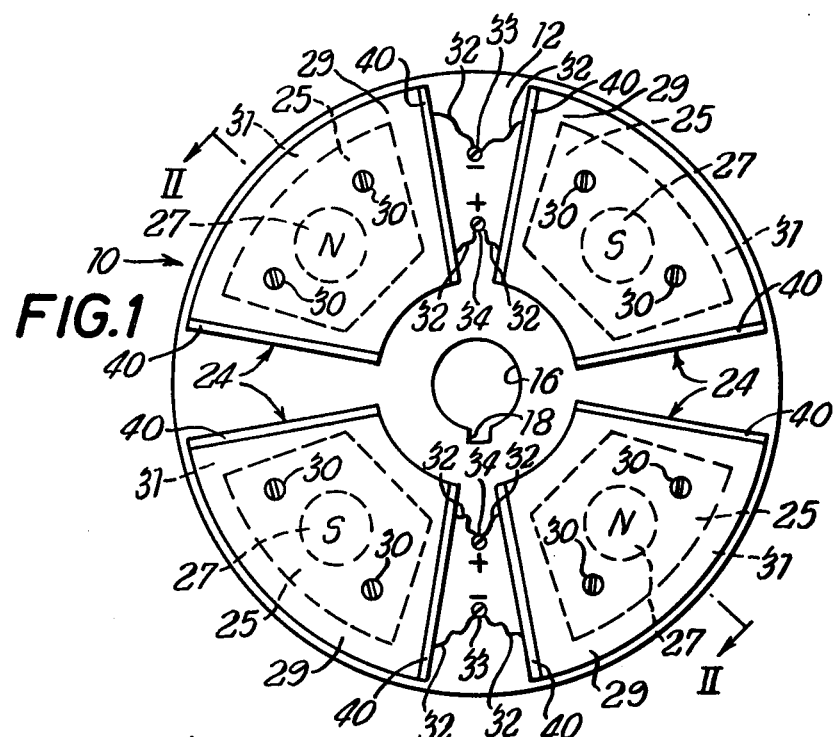
FIG. 1 is an end view (from the stator side) of a rotor designed for use in a synchronous machine in accordance with the present invention.
Figure 2:
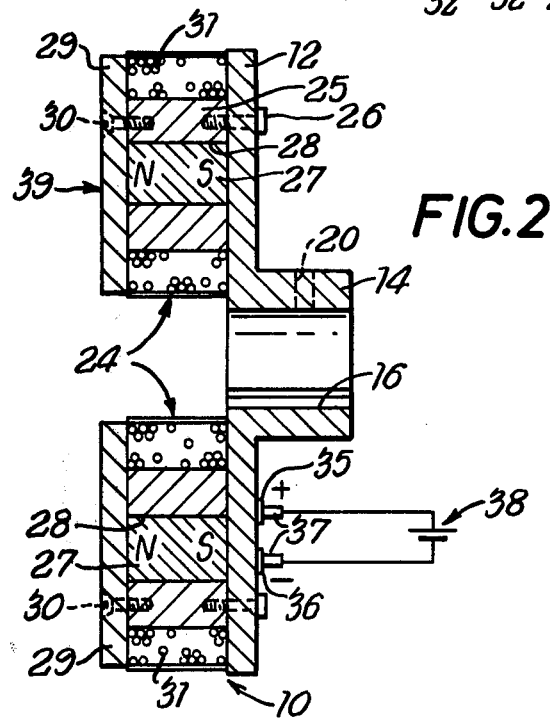
FIG. 2 is a cross-sectional view of the rotor shown in FIG. 1 and taken along the line II—II of FIG. 1.
Figure 3:
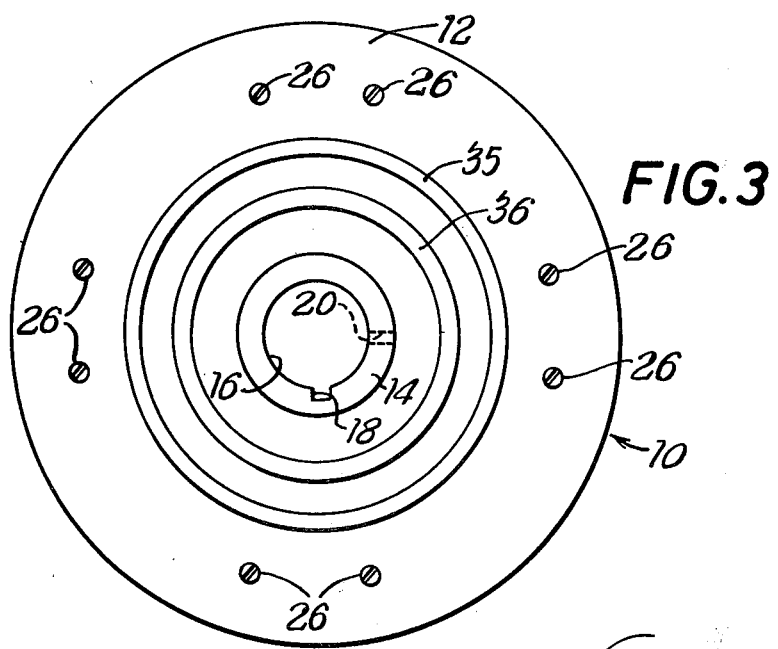
FIG. 3 is an end view of the rotor of FIGS. 1 and 2 from the side opposite to the view of FIG. 1.

A rotor for use in a synchronous machine in accordance with the present invention is shown generally in FIGS. 1 to 3 at 10. The rotor comprises a circular steel backplate 12 having a boss 14 formed integrally therewith. The boss 14 has a bore 16 therethrough and a keyway 18 extending along the inside of the bore to enable the rotor to be fitted on to a shaft of a driving engine or load. A tapped hole 20 running through the boss receives a screw 22 (FIG. 8) for securing the rotor in place once it has been fitted to the shaft.

Figure 4:
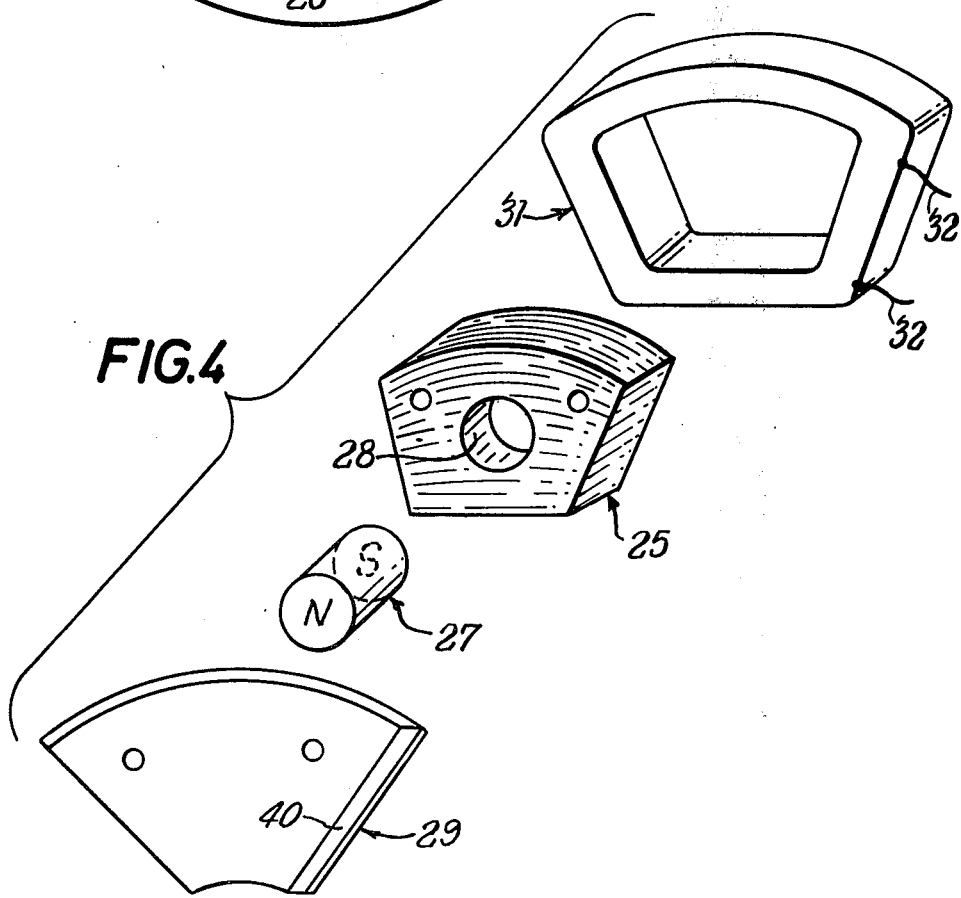
FIG. 4 is an perspective view of the parts forming one of the poles of the rotor of FIGS. 1 to 3.

Four like pole assemblies 24 are fitted to the back plate 12 at equal distances from and around the axis of the rotor 10. Each pole assembly comprises a pole yoke 25 which has two tapped holes therein, the yoke being releasably secured to the back plate 12 by a pair of screws or bolts 26 which extend through clearance holes in the back plate and into the tapped holes in the yoke. The pole yokes 25 are formed from magnetic material, for example as a stack of laminations, as can best be seen in FIG. 4. A cylindrical permanent bar magnet 27 is fitted within a correspondingly shaped bore 28 in each yoke 25.

Each yoke 25 extends axially away from the back plate 12 and has a flat pole shoe 29 of magnetic material releasably secured to its free end by means of screws 30 which pass through clearance holes in the shoe and into tapped holes in the free end of the yoke.

A field coil 31 surrounds each pole yoke and is sandwiched between the pole shoe 29 and the back plate 12. The ends 32 of the field coil windings, as can be seen most readily from FIG. 1, are connected to terminals 33 and 34. The terminals 33, 34 are respectively electrically connected through the back plate 12 to slip rings 35, 36 disposed on the rear of the back plate concentrically of the rotor axis. By means of brushes 37 contacting the ship rings 35, 36, a DC excitation source 38 can be connected to the field coils 31.

When the DC excitation source 38 is connected to the coils 31, magnetic fields are developed which extend axially away from the pole shoes 29. The coils 31 are so connected to the source 38 that alternate coils develop fields of opposite polarity. The net effect is a composite field emanating axially from the annular plane surface area 39 defined by the axially outer surfaces of the pole shoes 29, the field alternating in polarity, from pole to pole, around the rotor axis.

As can be seen from the drawings, both the pole yokes 25 and the pole shoes 29, in axial cross section, are shaped substantially as the outer parts of sectors of circles centred upon the rotor axis. This construction has been found to give a composite field which varies in a near sinusoidal manner around the axis of the rotor, the effect being improved if, as shown, the radially extending edges 40 of the pole shoes 29 are chamfered.

As shown in the drawings by the symbols N and S which designate, respectively, their north and south magnetic poles, the permanent magnets 27 are so disposed in the yokes 25 as to produce fields which are in the same directions as those produced by the associated field coils.

Figure 5:
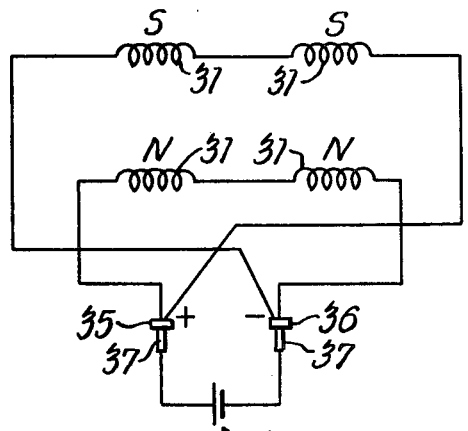
FIG. 5 is a circuit diagram illustrating how the field coils of the rotor of FIGS. 1 to 4 may be connected to form a closed loop.

As can be seen from FIG. 5, the field coils 31 are so connected to the slip rings 35 and 36 that, when the DC energization source 38 is not connected to the slip rings, all of the coils form a closed circuit. The reason for connecting the coils in this fashion will be explained later.

Figure 7:
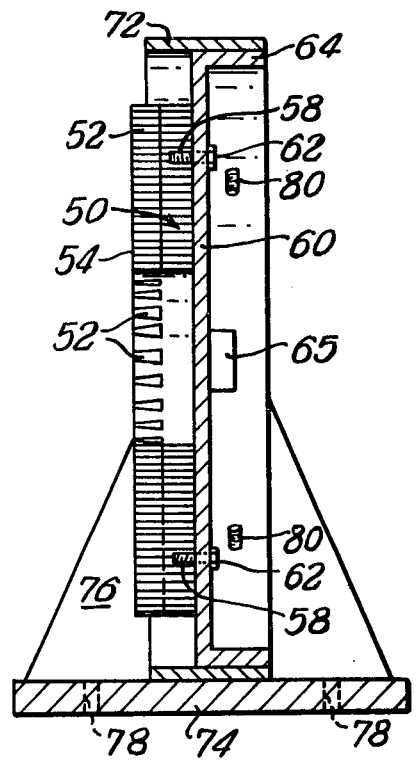
FIG. 7 is a cross-sectional view of the stator and support structure shown in FIG. 6, taken along the line VII—VII of FIG. 6, the windings being omitted for the sake of clarity.
Figure 6:
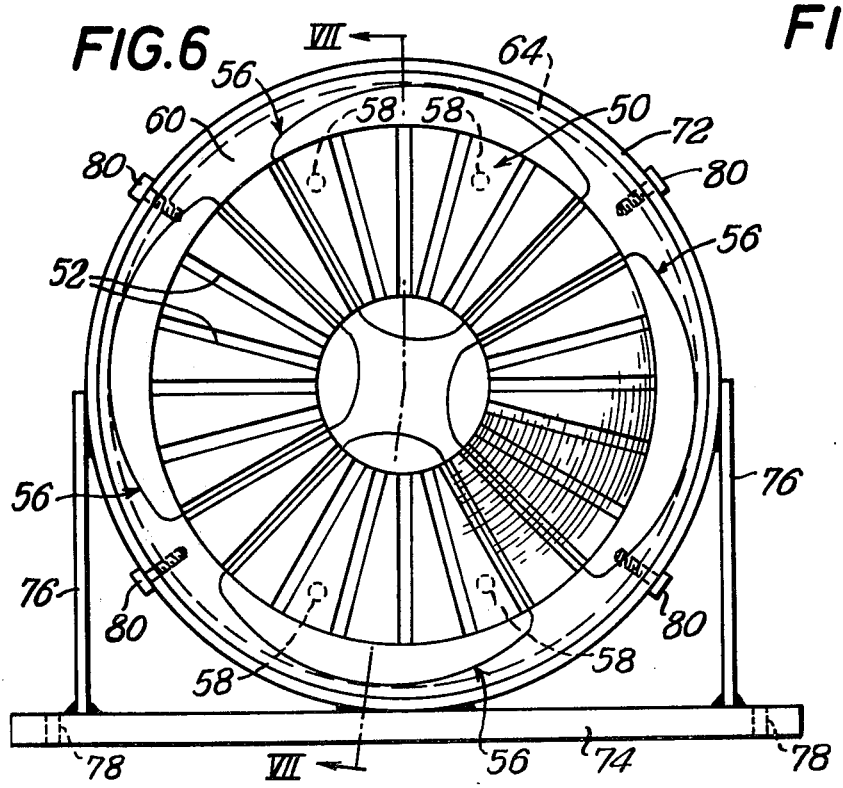
FIG. 6 is an end view (from the rotor side) of a stator and support structure therefor, intended for use with the rotor of FIGS. 1 to 4.

FIGS. 6 and 7 illustrate a stator or armature and a support structure therefor designed to cooperate with the rotor just described to form a synchronous machine. The basic component of the stator is an annular laminated core 50 formed from a continuous spirally wound magnetic steel strip. A plurality of radially extending slots 52 are formed on one face 54 (hereinafter referred to as the front face) of the core 50. The inner and outer diameters for this face 54 are substantially the same as those of the annular area 39 defined by the pole shoes 29 of the rotor. The slots 52 can be formed by stamping or by machining, e.g., milling. The slots 52 can be of any suitable configuration known to those skilled in the art. In FIG. 7, they are shown as having the well known tapered form in which the mouths of the slots are narrower than the bases.

FIG. 6 shows in schematic form how windings 56, previously made upon frames, are fitted into the stator core slots 52. The arrangements of the windings will not be described in detail, as the present stator can be wound in a manner which is totally analogous to the winding of the stator of a conventional cylindrical synchronous machine and the choice of winding patterns and the way in which the core should be wired to obtain single or polyphase operation will be fully apparent to one skilled in the art.

After fitting of the windings 56 to the core 50, the windings may be impregnated with varnish and baked, in conventional manner, to increase their resistance to moisture. The core and windings may, if required, be encapsulated in an epoxy resin.

The core 50 has four tapped holes 58 in the rear face thereof. The core is secured to a circular backplate 60 by means of four screws or bolts 62 which extend through clearance holes in the plate 60 and are screwed into the tapped holes 58 in the core 50. The outer periphery of the backplate 60 is provided with a circular flange 64, by means of which, as will be described below, the stator is releasably attached to the stator support structure. The windings 56 are wired to a terminal box 65 fitted to the backplate 60, whereby they may be connected to a supply cable also wired to the box.

The stator support structure comprises an open-ended cylindrical frame 72 which is welded to a flat base 74 and additionally supported by legs 76 welded to the frame 72 and the base 74. The base 74 has a plurality of holes 78 therein. The stator support structure and the stator can be secured in place, once they have been appropriately positioned, by passing fixing members through the holes 78.

The stator core and the backplate 60 are secured in place within the frame 72 by means of four radially directed screws or bolts 80 which pass through clearance holes in the frame 72 and are screwed into tapped holes in the flange 64.

Figure 8:
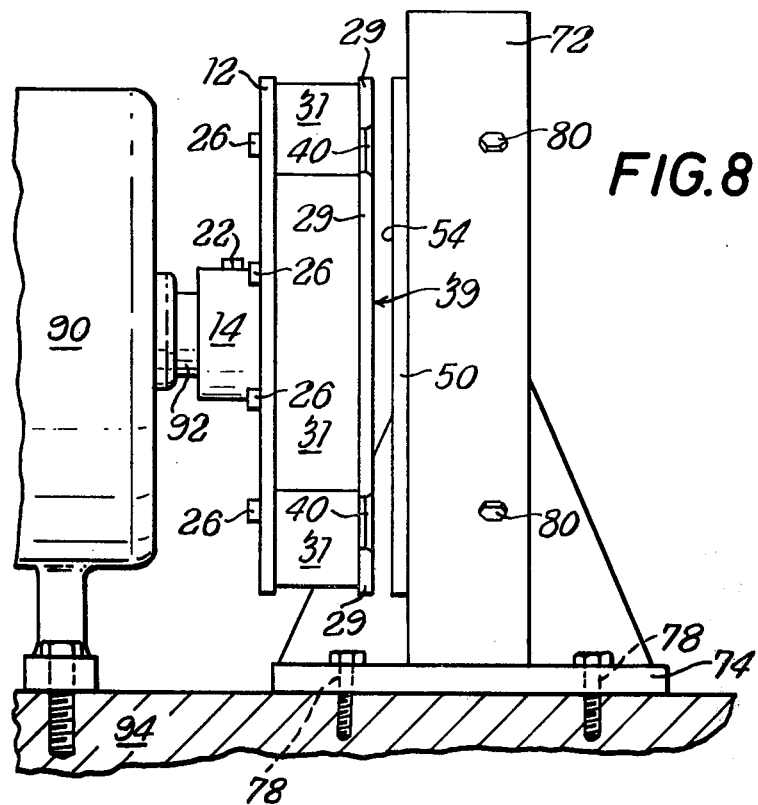
FIG. 8 is a side view of a synchronous machine formed from the components illustrated in the preceding figures and arranged in the operable condition for driving a load or for being driven by a driving engine.

FIG. 8 illustrates the components shown in FIGS. 1–7 brought together in the operable condition to form a synchronous machine arranged to drive a load (if a motor) or to be driven by a driving engine (if an alternator). For convenience, FIG. 8 will be described for the case in which the machine is functioning as a motor. In more detail, a load 90 having an input shaft 92 is secured to a resting surface 94, e.g. the frame of an item of process plant of which the load 90 forms part of the floor of a building in which such plant is housed.

The rotor 10 is keyed on to the shaft 92 and secured in place by operation of the screw 22, in like manner to the way in which a "half-coupling" would be secured to the shaft for it to be driven by a conventional electric motor having an output shaft provided with a corresponding half-coupling. To this end, it is advantageous in some cases for the rotor to be formed so that the bore 16 and keyway 18 are identical to those provided on a conventional half-coupling. The stator support frame is then moved with respect to the rotor such that the annular front surface 54 of the stator core 50 confronts the annular surface area 39 defined by the pole shoes 29 of the rotor. The position of the stator support frame is adjusted until the stator and rotor are substantially coaxial and the width of the air gap between the two facing surfaces 39 and 54 is substantially equal to the nominal air gap for the particular machine. As was explained in some detail hereinabove, the above-mentioned alignment operation does not have to be conducted with great precision and can therefore be carried out by virtually unskilled personnel. Once the stator and support frame have been correctly positioned, the support frame can be secured in place by passing bolts or other fixing members through the holes 78 in the base 74 and into the surface 94. In the drawings, the load 90 and stator support frame have been shown mounted at the same level. As will be appreciated, should this not be possible due to the shaft 92 not being spaced by the desired amount above the load support surface, the part of the surface on which the stator support structure is mounted can be recessed or built up as necessary.

Removal of the stator core from the machine when it is set up in the operable condition shown in FIG. 8, e.g. for replacement, cleaning or repair, is a very simple operation and can be carried out by unskilled personnel. All that is necessary is to unscrew the screws or bolts 80, whereupon the backplate 60 and stator core can be removed as a whole rearwardly from the frame 72. The cleaned or tested core or a replacement core can be inserted in the converse manner and will automatically be in the correct position. If the stator core has burnt out and is to be replaced, then provided a new core is at hand, the total down time of the machine is literally 2 or 3 minutes only. The replacement core can either be already mounted on a new backplate so that the new core and backplate can be inserted, or, in order to reduce the cost of spare parts, the old core can be removed from the backplate and replaced by the new one simply by removing and replacing the screws or bolts 62.

Replacement of the stator core, in short, is quick and easy. There is no need to dismantle and/or disturb a housing. The means of releasing the core, i.e. the bolts or screws 80, and their manner of use, are immediately apparent to an unskilled person.

Replacement of any of the field coils 31, or removal simply for cleaning, testing and/or inspection, is equally simple. If any one field coil 31 is to be removed the associated bolts or screws 26 are unscrewed and the ends 32 of the coil are disconnected from the terminals 33, 34. The pole assembly comprising the pole shoe 29, the magnet 27, the pole yoke 25 and the coil 31 is then bodily moved radially away from the rotor 10. A replacement assembly, or the same assembly with a replacement coil, can be simply and quickly refitted in the converse manner.

The way in which the machine set up as shown in FIG. 8 functions will now be described. If the machine is functioning as an alternator, the rotor 10 is accelerated to the desired operating speed and the DC energisation source 38 is connected to the field coils to produce the composite field, which rotates with the rotor. This field cuts the stator windings and induces currents in them.

The reason for the provision of the permanent magnets 27 is as follows. As it is a feature of the present machine that the airgap between the rotor and stator can be quite large, when the alternator is started up the small residual magnetism contained in the rotor poles may not be sufficient to generate enough flux to cross the air gap to provide an output and the alternator will thus fail to excite. If the magnets 27 are provided, then even when the speed of the driving engine is low on starting the magnets 27 will supplement the field produced by residual magnetism and provide sufficient flux to self-excite the alternator. The small output produced regenerates further increases in field potential so producing the full output of the machine. During normal operation, the fields produced by the magnets 27 reinforce those produced by the field coils 31 and will reduce the total excitation required from the coils for a full load output. The magnets 27 never become demagnetised, as during normal operation each of them is constantly being magnetised in the correct direction by the associated field coil.

If the machine is functioning as a synchronous motor, current is supplied to the stator windings to produce, in known manner, a rotating magnetic field. This field rotates about the axis of the stator core. The rotor is accelerated until it runs up to synchronous speed, i.e. until it is rotating at the same speed as the stator field. The field coils 31 are then excited so that the rotor and stator fields lock together in synchronism and the rotor is thereby driven by the stator field.

If the field coils 31 are interconnected to form a closed loop as described above with reference to FIG. 5, the rotor 10 does not have to be separately driven up to synchronous speed. This is because the rotating field produced by the current fed to the stator windings 56 induces currents in the closed loop which produce a field which interacts with the stator field to produce a torque which accelerates the rotor up to synchronous speed in a manner analogous to the operation of an induction motor. When synchronous speed is attained, DC energization is applied to the field coils 31 from the source 38 and the machine then operates as a synchronous motor.

It will be seen that the rotor 10 revolves in free air and that air can circulate freely around the stator windings: there is no housing to restrict air circulation and thereby give rise to a high operating temperature. The machine therefore operates at a reasonably low temperature and in many cases the machine will operate satisfactorily without forced cooling.

Figure 9:
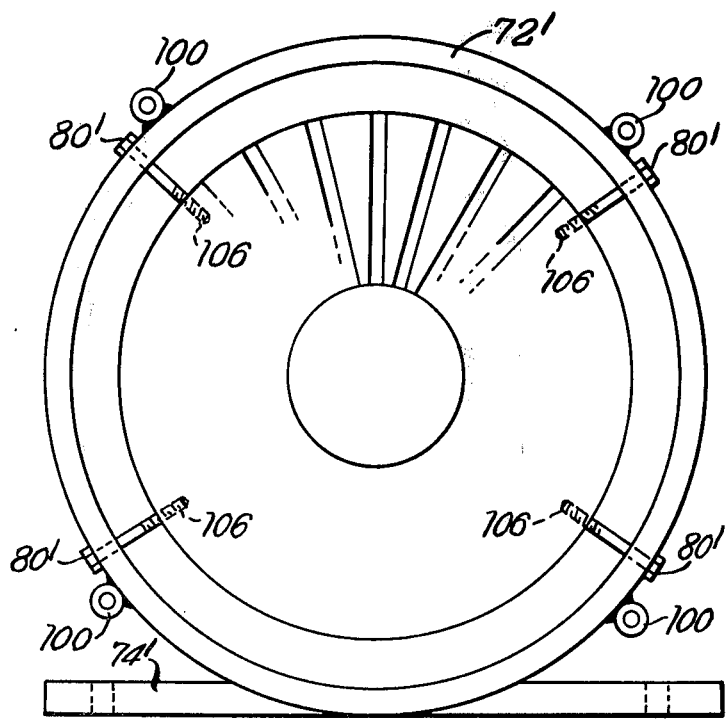
FIG. 9 is a view, corresponding to FIG. 6, of a modified stator and support structure and illustrates both an alternaive way of mounting the stator in the support structure and an alternative means of fixing the support structure in place.
Figure 10:
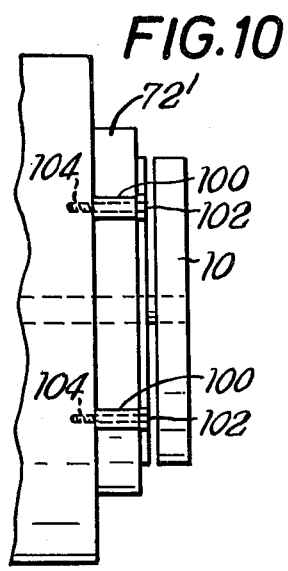
FIG. 10 is a largely schematic side view showing how a stator support structure like that of FIG. 9 is fixed in place.

FIG. 9 of the drawings shows a modified stator and support structure. As will be seen, like the support structure previously described, it comprises a circular frame 72' secured to a flat base 74'. The modified structure can thus be installed in the same way as shown in FIG. 8. However, the modified structure is provided with an alternative mounting arrangement comprising four sockets 100 formed from short lengths of steel tube which extend axially of the stator core and frame and are welded to the outer periphery of the frame. If this alternative arrangement is used, the frame 72' can be secured to a surface extending perpendicularly of the axis of the frame, e.g. directly to the casing of a load, as shown in FIG. 10, by passing screws or bolts 102 through the sockets 100 and into tapped holes 104 in the surface. If this alternative mounting arrangement is used, it may be convenient or necessary to mount the rotor outside of the support structure as shown in FIG. 10. Naturally, the inner diameter of the annular stator core will be arranged in this case to be sufficiently large so that the radially inner pole slot-traversing parts of the stator windings do not interfere with the shaft of the load. It will be apparent that, even if the rotor 10 is mounted outside the stator support structure as shown, replacement of the stator core is still a simple matter, the only extra operation being the simple removal and replacement of the rotor 10. It should be appreciated, however, that provided the surface to which the frame 72' is affixed is sufficiently recessed to take the rotor 10, it can be mounted on the inside of the stator support structure in a manner similar to the arrangement shown in FIG. 8.

If required, the modified structure of FIG. 9 need not be provided with the base 74': as shown in FIG. 7, it can instead be provided solely with the alternative mounting arrangement formed by the sockets 100.

FIG. 9 also illustrates an alternative way of mounting the stator core to the stator support structure. This alternative arrangement is described with reference to FIG. 9 solely for convenience, and can perfectly well be incorporated in the stator support structure shown in FIGS. 6 and 7 instead of the arrangement there described.

In the modified arrangement, the backplate 60 is not provided. Instead, the stator core is provided with radial tapped holes 106. Bolts and screws 80' extend through clearance holes in the circular frame 72' and are screwed into the tapped holes 106. In this way, the stator is, as it were, suspended in space inside the frame 72'. Naturally, sufficient space must be left between the outer periphery of the core and the inside of the frame 72' for the radially outer slot-outer pole pitch traversing parts of the stator core windings.

Figure 11:
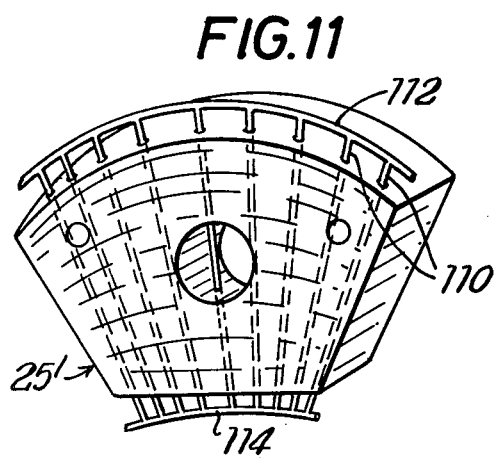
FIG. 11 is a perspective view of a modified form of pole yoke suitable for use in the rotor.

A modified form of pole piece or yoke suitable for use in the machine described above in place of the pole yoke 25 is shown at 25' in FIG. 11. The yoke 25' is generally the same as the yoke 25, but is modified by the provision of an auxiliary winding. The auxiliary winding comprises solid copper bars 110 which are directed through respective generally radially extending apertures through the pole piece 25' adjacent the face thereof to which the pole shoes 29 is attached. The bars 110 are short-circuited together at their radially outer and inner end, respectively, by copper shorting bars 112 and 114.

The auxiliary winding has two functions. During normal operation of the machine it acts as a speed regulator by reducing any tendency for the machine to go over or under synchronous speed, as might be caused by an abrupt increasing speed or an overload, respectively. If the machine tends to depart from synchronous speed, a current is induced in the auxiliary winding in like manner to the way in which a current is induced in a cage rotor of an induction motor, as producing a torque on the motor which tends to restore it to synchronous speed. Thus, in this capacity, the auxiliary winding functions as a damping winding.

The second function of the winding is to enable the machine, when functioning as a synchronous motor, to be self-starting. It can thus be employed instead of or as well as the closed-loop field coil feature described above with reference to FIG. 5 to avoid the need to provide separate means for running up the rotor to synchronous speed. If current is applied to the stator windings, with the rotor stationary, to produce a rotating magnetic field, the field induces currents in the or each auxiliary winding so that the rotor is accelerated in a manner analogous to the functioning of a cage wound induction motor. When the rotor attains or approaches synchronous speed after acceleration in this manner, excitation is applied to the field coils and the motor thereafter functions in its normal, synchronous mode.

Figure 12:
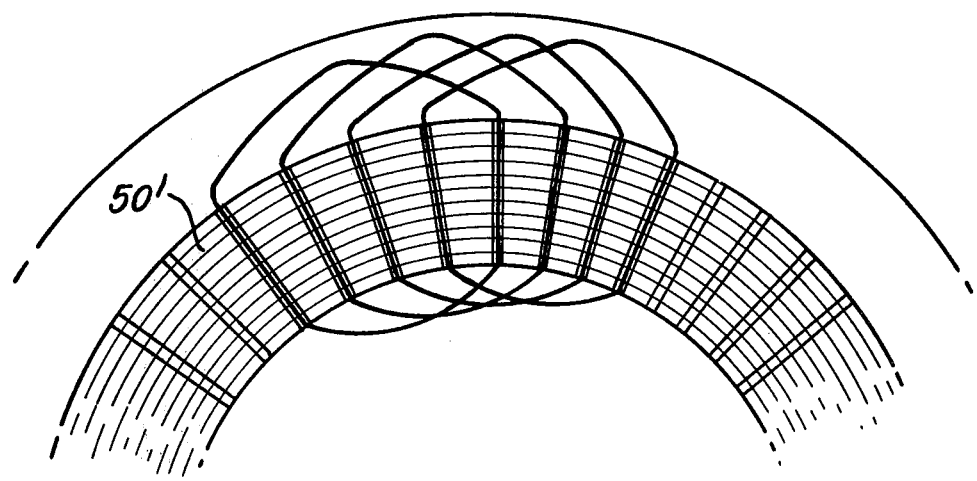
FIg. 12 is a fragmentary view, corresponding to FIGS. 6 and 9, of a modified stator particularly suited to use in large machines.

FIG. 12 is a fragmentary view of the stator of a modified form of synchronous machine particularly suited for use as a large output alternator. The construction of the stator can be generally the same as those described above with reference to FIGS. 6 and 9, but with one important difference. In FIGS. 6 and 9, the ratio of the radial extent or thickness of the annular core 50 to its outer diameter approaches unity. In other words, the core 50 is of a near disc-like configuration. However, in the core 50' of the stator shown in FIG. 12 this ratio is very much less than unity so that the core 50' takes the form of a narrow closed band of magnetic material. A rotor designed to work with the stator if FIG. 12 can be of generally the same construction, save that the annular area 39 defined by the outer faces of the pole shoes 29 will be tailored to be of substantially the same configuration as the are of the face of the core 50'. In other words, the rotor poles will occupy a narrow annular area on the rotor corresponding to the stator core 50'. As has been explained in detail hereinbefore, this form of construction enables a large number of poles to be fitted on the rotor so that so that it can provide a high output at low speeds, thus breaking through the power barrier imposed on conventional alternators by the problem of centrifugal force.

The invention may be embodied in many other ways than those particularly described above. For instance, the machine, instead of being excited from a separate source, can be self-excited or excited by a pilot excitor.

In the arrangements particularly described above, the rotor has been formed like the half-coupling conventionally used for coupling electrical machines to drive shafts so that the rotor can conveniently be mounted on a shaft. However, it will be appreciated that in some applications the rotor may be integrally with the shaft or secured to the shaft in some other way, or may even be incorporated in the driving engine or the load to be driven. For example, in medium and large alternator driving engines having a flywheel forming part of the engine, the field pole assemblies can be mounted directly on the flywheel. This arrangement of the field poles can be used to particular advantage when the machine is arranged as a large output alternator of the form described above with reference to FIG. 12. Providing the slip rings 35, 36 on the rear face of the rotor back plate 12, as described before, has the advantage that the machine is as narrow and flat as possible so maintaining the size and volume advantage per unit output which the present machine has over conventional machines. However, if required, the slip rings can instead be constructed in a tubular form and mounted on the rotor shaft, as in conventional machines. Further, for large or medium machines or for special applications, a brushless excitation system may be employed.

The forms for machine particularly described above all have rotors of the salient-pole type. It is important to note, however, as was mentioned before, that this invention can equally well be applied to machines having rotors with non-salient poles, a distributed form of field coil and excitation then being used. By way of example a non-salient pole rotor can have core elements jointly formed by a single core of substantially the same form and size as the annular core 50 or 50' used on the stator. The field coils can be placed in the slots in the rotor core in substantially the same way as the stator windings are fitted to the stator core, and can be excited in the same way as the field coils 31 of the rotor described above with reference to FIGS. 1 to 5.

The present synchronous machine, like conventional synchronous machines, can be used as an alternator or as a synchronous motor. In the first case, the rotor is driven and electrical power is thereby supplied by the stator windings, and in the second case power is supplied to the stator windings so that the rotor is thereby driven. The present machine, again like a conventional synchronous machine, can also be used as a phase-advancer of synchronous-capacitor for power factor correction and load improvement.

As explained before, the stator can be wound so that, when the machine is used as an alternator, it produces either a single phase or a polyphase output. It will also be appreciated that, by adding a commutator and brushes or a rectifier, the alternator output can be converted from AC to DC.

The stator core and windings can be replaced, without movement of the support structure, in other ways than those described above. For example, the core and windings may be arranged in a flat, cartridge form, not unlike a recording tap cassette, so as to be placed or slid into position on the support structure and there clipped or otherwise releasably secured in place.

For the sake of convenience only, the various forms of machine described hereinabove have been illustrated and described as being installed in a horizontal position, i.e. with the shaft on which rotor is mounted having its axis extending horizontally. However, the machine can instead be installed with the rotor attached to a shaft which is vertical or inclined between the horizontal and vertical.

I claim:

1. An electrical synchronous machine comprising a rotor having a plurality of field coils of alternating polarities arranged on core elements of magnetic material and disposed around the axis of rotation of the rotor to produce a magnetic field extending away from the core elements and axially of the rotor; means mounting said rotor to a shaft of a device independent of the machine; a stator having a plurality of windings arranged on an annular core of a magnetic material and disposed around an axis of the stator so that parts of the windings lie adjacent a surface of the core; and a structure supporting said stator; said rotor, on the one hand, and the combination of said stator and support structure, on the other hand, being constructed as entirely discrete elements whereby said machine may be made operable by positioning said support structure with respect to the rotor mounted on said shaft so that the rotor and the stator core are substantially coaxial and so that the rotor core elements confront said surface of the stator core, the core elements for the field coils comprise like, individual pole yokes for each coil, further comprising a substantially circular and plate-like support member and means securing the yokes each at one end to a surface of said support member, which surface is normal to the axis of rotation of the rotor, the yokes extending axially away from the support surface and being equally spaced around the axis of rotation, the core elements further comprise a plurality of flat pole shoes, a respective, pole shoe being secured to the other end of each pole yoke, the surfaces of the shoes remote from the support member lying in a common plane normal to the axis of rotation of the rotor.

2. An electrical synchronous machine comprising: a rotor having a plurality of field coils of alternating polarities arranged on core elements of magnetic material and disposed around the axis of rotation of the rotor to produce a magnetic field extending away from the core elements and axially of the rotor; means mounting said rotor to a shaft of a device independent of the machine; a stator having a plurality of windings arranged on an annular core of a magnetic material and disposed around an axis of the stator so that parts of the windings lie adjacent a surface of the core; and a structure supporting said stator; said rotor, on the one hand, and the combination of said stator and support structure, on the other hand, being constructed as entirely discrete elements whereby said machine may be made operable by positioning said support structure with respect to the rotor mounted on said shaft so that the rotor and the stator core are substantially coaxial and so that the rotor core elements confront said surface of the stator core, a respective permanent magnet is disposed within each core element, each magnet having a polarity the same as that of the associated core element.

3. An electrical synchronous machine comprising: a rotor having a plurality of field coils of alternating polarities arranged on core elements of magnetic material and disposed around the axis of rotation of the rotor to produce a magnetic field extending away from the core elements and axially of the rotor; a stator having a plurality of windings arranged on an annular core of a magnetic material and disposed around an axis of the stator so that parts of the windings lie adjacent a surface of the core; and a structure supporting said stator; said rotor, on the one hand, and the combination of said stator and support structure, on the other hand, being constructed as entirely discrete elements whereby said machine may be made operable by positioning said support structure with respect to the rotor mounted on said shaft so that the rotor and the stator core are substantially coaxial and so that the rotor core elements confront said surface of the stator core, the core elements for the field coils comprise like, individual pole yokes for each coil, further comprising a substantially circular and plate-like support member and means securing the yokes each at one end to a surface of said support member, which surface is normal to the axis of rotation of the rotor, the yokes extending axially away from the support surface and being equally spaced around the axis of rotation, the field coils are connected to a pair of concentric slip rings on a surface of the support member opposite to the surface to which the pole yokes are secured.

4. An electrical synchronous machine comprising: a rotor having a plurality of field coils of alternating polarities arranged on core elements of magnetic material and disposed around the axis of rotation of the rotor to produce a magnetic field extending away from the core elements and axially of the rotor; means mounting said rotor to a shaft of a device independent of the machine; a stator having a plurality of windings arranged on an annular core of ammagnetic material and disposed around an axis of the stator so that parts of the windings lie adjacent a surface of the core; and a structure supporting said stator; said rotor, on the one hand, and the combination of said stator and support structure, on the other hand, being constructed as entirely discrete elements whereby said machine may be made operable by positioning said support structure with respect to the rotor mounted on said shaft so that the rotor and the stator core are substantially coaxial and so that the rotor core elements confront said surface of the stator core, means releasably securing the stator core in a desired position with respect to the support structure and means defining an opening within the support structure of sufficient size to permit the stator core and the windings thereon to be removed from and replaced on the support structure without movement of the support structure, said stator support structure comprises a cylindrical frame open at both ends and having a plurality of radially directed apertures therethrough, one said open end comprising said opening for withdrawal and replacement of the stator core and the windings thereon, wherein said means releasably securing the stator core positions the stator core with said one face of the stator core adjacent the other open end of said frame, and wherein said means releasably securing the stator core comprises a plurality of threaded members extending radially inwardly through said apertures in the frame.

5. An electrical synchronous machine comprising: a rotor having a plurality of field coils of alternating polarities arranged on core elements of magnetic material and disposed around the axis of rotation of the rotor to produce a magnetic field extending away from the core elements and axially of the rotor; a stator having a plurality of windings arranged on an annular core of a magnetic material and disposed around an axis of the stator so that parts of the windings lie adjacent a surface of the core; and a structure supporting said stator; said rotor, on the one hand, and the combination of said stator and support structure, on the other hand, being constructed as entirely discrete elements whereby said machine may be made operable by positioning said support structure with respect to the rotor mounted on said shaft so that the rotor and the stator core are substantially coaxial and so that the rotor core elements confront said surface of the stator core, the core elements for the field coils comprise like, individual pole yokes for each coil, further comprising a substantially circular and plate-like support member and means connecting the field coils on a surface of the support member opposite to the surface to which the pole yokes are secured.

6. An electrical synchronous machine for driving a shaft of a device independent of the machine which comprises a rotor having a plurality of field coils of alternating polarities arranged on core elements of magnetic material and disposed around the axis of rotation of the rotor to produce a magnetic field extending away from the core elements axially of the rotor, a stator having a plurality of windings arranged on an annular core of magnetic material and disposed around an axis of the stator to present parts of the windings adjacent a surface of the core, a structure fixedly mounting said stator, means for mounting said rotor on a shaft of a device independent of said machine, said rotor, on the one hand, and a combination of said stator and support structure, on the other hand, being entirely discreet elements whereby said machine may be operatively engaged with said independent device by selective positioning of said support structure with respect to said rotor mounted on the shaft of the device so that the rotor and the stator core are substantially coaxial with the rotor core elements confronting said surface of the stator core.

7. The machine of claim 6, wherein the core elements for the field coils are individual pole yokes for each core and wherein a plate support member has said yokes secured to one face thereof which is normal to the axis of rotation of the rotor with the yokes extending axially away from said face and spaced equally around the axis of rotation of the rotor.

8. The machine of claim 7, wherein at least one threaded member extending through a hole defined in the support member and into a tapped hole defined in the yoke secures the yoke to the support member whereby the yoke and coil are removed from the support member transversely of the axis of rotation of the rotor by unscrewing the threaded member without movement of the rotor or stator.

9. An electrical synchronous machine comprising a rotor having a plurality of field coils of alternating polarities arranged on core elements of magnetic material and disposed around the axis of rotation of said rotor to produce a magnetic field extending away from said core elements and axially of said rotor, a stator having a plurality of windings arranged on a core of magnetic material and disposed around an axis of said stator so that parts of said windings lie adjacent a surface of said core, means positioning said stator and rotor coaxially and with said rotor core elements confronting said surface of said core, and an auxiliary winding provided for at least one of said core elements, said auxiliary winding comprising a plurality of conductors each extending substantially radially through openings enclosed in the core element, and radially inner and outer shorting conductors connecting said plurality of conductors together at their radially inner and outer ends, respectively.

10. A high output electrical alternator comprising a rotor having a plurality of field coils of alternating polarities arranged on magnetic core means and disposed around the axis of rotation of the rotor to produce a magnetic field extending axially away from the rotor, a stator having a plurality of windings arranged on a core of magnetic material and disposed around an axis of the stator presenting parts of the windings adjacent a surface of said stator core, said magnetic field produced by said rotor having an annular ring area, said stator core having a complementary ring-shaped configuration, the ratio of the radial extent of said ring-shaped configuration to the radial extent of the outer diameter of the stator core being less than one, and means positioning said stator and rotor coaxially with said annular ring area of the rotor confronting said surface of the stator core.

11. The alternator of claim 10, wherein the field coils on the magnetic core means, in cross section normal to the axis of rotation of the rotor, are shaped substantially as the outer parts of sectors of circles centered upon the axis of rotation of the rotor.

12. The machine of claim 9, wherein said field coils are connected to form a closed circuit including all of the coils.

* * * * *